United States Patent
Inoue (10) Patent No.: US 7,055,916 B2
(45) Date of Patent: Jun. 6, 2006

(54) BRAKE HYDRAULIC PRESSURE CONTROL APPARATUS FOR VEHICLE

(75) Inventor: Yasumi Inoue, Kariya (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 10/910,419

(22) Filed: Aug. 4, 2004

(65) Prior Publication Data

US 2005/0029857 A1    Feb. 10, 2005

(30) Foreign Application Priority Data

Aug. 7, 2003   (JP) ............................. 2003-288848

(51) Int. Cl.
*B60T 8/40*    (2006.01)
(52) U.S. Cl. ................. 303/116.1; 303/119.1
(58) Field of Classification Search ............. 303/113.1, 303/116.1, 119.1, 61, 68, 89, 155, 156
See application file for complete search history.

(56) References Cited

U.S. PATENT DOCUMENTS

| | | | |
|---|---|---|---|
| 5,156,447 A | | 10/1992 | Hummel et al. |
| 5,346,292 A | * | 9/1994 | Hall ............................ 303/156 |
| 5,779,328 A | | 7/1998 | Mergenthaler et al. |
| 6,199,960 B1 | | 3/2001 | Kramer |
| 6,269,921 B1 | | 8/2001 | Agnew et al. |

FOREIGN PATENT DOCUMENTS

| | | |
|---|---|---|
| DE | 42 13 740 A | 10/1993 |
| EP | 0 759 388 A | 2/1997 |
| JP | 07-089423 | 4/1995 |
| WO | 95/03962 A | 2/1995 |

* cited by examiner

*Primary Examiner*—Xuan Lan Nguyen
(74) *Attorney, Agent, or Firm*—Buchanan Ingersoll PC (57) ABSTRACT

A brake hydraulic pressure control apparatus includes a pressure-increasing valve disposed between a master cylinder and a wheel cylinder; a pressure-reducing valve disposed between the wheel cylinder and a reservoir; and a hydraulic pump for pumping brake fluid from the reservoir (secondary circuit) so as to return the brake fluid to a primary circuit between the master cylinder and the pressure-increasing valve. Through control of these valves, brake hydraulic pressure within the wheel cylinder is controlled. In addition, the hydraulic pump is driven at least over a period in which the brake hydraulic pressure control is performed. When the vehicle is in a predetermined state which indicates that the driver does not have an intention of performing the brake operation, both the pressure-increasing valve and the pressure-reducing valve are opened over a predetermined period of time so as to establish communication between the primary circuit and the secondary circuit.

12 Claims, 7 Drawing Sheets

BRAKE HYDRAULIC PRESSURE CONTROL APPARATUS FOR VEHICLE

BACKGROUND OF THE INVENTION

1. Field of the Invention

The present invention relates to a brake hydraulic pressure control apparatus for a vehicle, such as an antilock brake system (ABS), which includes a pressure-increasing valve interposed in a hydraulic circuit between a master cylinder and a corresponding wheel cylinder, a pressure-reducing valve interposed in a hydraulic circuit between the wheel cylinder and a reservoir, and a hydraulic pump for pumping brake fluid that flows from the wheel cylinder to the reservoir via the pressure-reducing valve and returning the pumped brake fluid to a hydraulic circuit between the master cylinder and the pressure-increasing valve, and which is configured to control the brake hydraulic pressure within the wheel cylinder through control of the pressure-increasing valve and the pressure-reducing valve and to drive the hydraulic pump in accordance with the status of the vehicle.

2. Description of the Related Art

Heretofore, brake hydraulic pressure control apparatuses of such a type are widely known (see, for example, Japanese Patent Application Laid-Open (kokai) No. 7-89423). The disclosed conventional apparatus utilizes a normally-open solenoid valve as the above-described pressure-increasing valve and a normally-closed solenoid valve as the above-described pressure-reducing valve, and performs brake hydraulic pressure control, such as brake hydraulic pressure control by means of an antilock brake system (hereinafter referred to as "ABS control"), by opening and closing the normally-open solenoid valve and the normally-closed solenoid valve, respectively.

Brake fluid consumed as a result of performance of the brake hydraulic pressure control; i.e., brake fluid that flows into the above-described reservoir via the normally-closed solenoid valve, must be returned, without fail, to a hydraulic circuit upstream of the pressure-increasing valve (hereinafter referred to as a "primary circuit"). Accordingly, in general, the conventional apparatus is configured to drive the above-described hydraulic pump over a period between start of the brake hydraulic pressure control and end of the brake hydraulic pressure control and to continue the drive of the hydraulic pump until a predetermined period of time elapses after the end of the brake hydraulic pressure control, while maintaining a state in which the solenoid valves have been brought into their non-excited states (accordingly, the normally-closed solenoid valve is in a closed state).

Further, the conventional apparatus is generally configured in such a manner that immediately after an ignition switch is brought from an OFF state to an ON state, for so-called initial check, the apparatus drives the hydraulic pump over a predetermined period of time, while maintaining a state in which the solenoid valves are in their non-excited states (accordingly, the normally-closed solenoid valve is in a closed state).

At a point in time when drive of the hydraulic pump is ended after completion of the brake hydraulic pressure control or at the time of initial check, a negative pressure may be generated within a hydraulic circuit from the normally-closed solenoid valve to the reservoir and within a hydraulic circuit from the reservoir to the hydraulic pump (the inlet side thereof) (hereinafter, these hydraulic circuits are collectively referred to as a "secondary circuit").

The negative pressure generated within the secondary circuit is held so long as the normally-closed solenoid valve is maintained in a non-excited state (i.e., a closed state). Accordingly, when the brake hydraulic pressure control or the initial check is performed repeatedly (in particular, when only the initial check is performed repeatedly), the magnitude of the negative pressure increases each time, with the result that air may be generated in the secondary circuit because of cavitation.

If the above-described brake hydraulic pressure control is performed in a state in which air has been generated within the secondary circuit, the air flows into the primary circuit as a result of drive of the hydraulic pump, whereby an operation stroke of a brake operation member (a brake pedal in the case of a four-wheeled vehicle, a brake lever in the case of a two-wheeled vehicle) increases by an amount corresponding to the volume of the generated air. In other words, the conventional apparatus has a drawback in that the operation feel of the brake operation member may deteriorate because of generation of air within the secondary circuit.

SUMMARY OF THE INVENTION

The present invention has been accomplished in order to cope with the above-described drawback, and an object of the present invention is to provide a brake hydraulic pressure control apparatus for a vehicle which can prevent generation of air within a secondary circuit to thereby maintain good operation feel of a brake operation member.

The present invention provides a brake hydraulic pressure control apparatus for a vehicle comprising: a pressure-increasing valve interposed in a hydraulic circuit between a wheel cylinder and a master cylinder which generates brake hydraulic pressure in accordance with brake operation by a driver; a pressure-reducing valve interposed in a hydraulic circuit between the wheel cylinder and a reservoir; hydraulic pressure control means for controlling brake hydraulic pressure within the wheel cylinder through control of the pressure-increasing valve and the pressure-reducing valve; a hydraulic pump for pumping brake fluid that flows from the wheel cylinder to the reservoir via the pressure-reducing valve and returning the pumped brake fluid to a hydraulic circuit between the master cylinder and the pressure-increasing valve; pump drive means for driving the hydraulic pump in accordance with a state of the vehicle; and communication control means for performing communication control adapted to open both the pressure-increasing valve and the pressure-reducing valve over a predetermined period of time when the vehicle is in a predetermined state which indicates that the driver does not have an intention of performing the brake operation.

Preferably, a normally-open solenoid valve is used as the pressure-increasing valve, and a normally-closed solenoid valve is used as the pressure-reducing valve, in order to achieve a failsafe function. Further, the pump drive means is configured to drive the hydraulic pump, for example, during a period between a point in time when the brake hydraulic pressure control is started by the hydraulic pressure control means and a point in time when a predetermined period of time elapses after end of the brake hydraulic pressure control, or during a predetermined period of time at the time of an initial check operation.

A conceivable measure for preventing generation of air within the secondary circuit (that is, an increase in the magnitude of the negative pressure) is to open both the pressure-increasing valve and the pressure-reducing valve at an appropriate timing so as to establish communication between the primary circuit and the secondary circuit, to thereby forcibly equalize the brake hydraulic pressure within the secondary circuit with the brake hydraulic pressure within the primary circuit (accordingly, a pressure equal to or higher than the atmospheric pressure). However, if a driver operates the brake pedal during a period in which communication is established between the primary circuit and the secondary circuit, a proper brake hydraulic pressure corresponding to the brake pedal operation may fail to be generated within the wheel cylinders.

In view of the foregoing, the communication control means performs the communication control adapted to open both the pressure-increasing valve and the pressure-reducing valve over a predetermined period of time when the vehicle is in a predetermined state which indicates that the driver does not have an intention of performing the brake operation. This operation makes it possible to prevent generation of air within the secondary circuit, while avoiding occurrence of a state in which a brake hydraulic pressure according to the driver's intention is not generated within the wheel cylinder. Moreover, since such communication control can be achieved through mere modification of software (program) for controlling the pressure-increasing valve and the pressure-reducing valve, without modification of the physical configuration of the hydraulic circuit, the production cost of the apparatus can be lowered.

In this case, the communication control means is preferably configured to determine that the vehicle is in the predetermined state when the vehicle starts. When the vehicle is started, the driver is considered not to have an intention of performing brake operation. Therefore, this configuration makes it possible to correctly determine that the driver does not have an intention of performing brake operation.

Moreover, the communication control means is preferably configured to determine that the vehicle is in the predetermined state when any one or two of the following conditions are satisfied; (1) a brake switch, which enters an ON state or an OFF state depending on whether or not the driver performs brake operation, is in the OFF state, (2) an acceleration of the vehicle along the front-back direction of a vehicle body is in excess of a predetermined value, (3) an amount of operation of an accelerator pedal by the driver is in excess of a predetermined value, and (4) an increasing speed of rotational speed of a drive source of the vehicle is in excess of a predetermined value.

When one or more of these conditions are satisfied, the vehicle is in an accelerating state, and the driver is considered not to have an intention of performing brake operation. Therefore, this configuration also makes it possible to correctly determine that the driver does not have an intention of performing brake operation.

Moreover, the communication control means is preferably configured to determine that the vehicle is in the predetermined state when the ignition switch of the vehicle is in the OFF state. When the ignition switch is in the OFF state; i.e., when the ignition switch is switched from the ON state to the OFF state (or when a predetermined period of time elapses, with the ignition switch maintained in the OFF state, after the ignition switch is switched from the ON state to the OFF state), in order to safely park the vehicle, the driver (a person who was the driver) has already secured a state in which the vehicle can be maintained in a stopped state without need for brake pedal operation (e.g., in the case of a four-wheeled vehicle, a state in which a parking brake has been operated). Therefore, the driver is considered not to have an intention of performing brake pedal operation. Accordingly, this configuration also makes it possible to correctly determine that the driver does not have an intention of performing brake operation.

Moreover, the communication control means is preferably configured to determine that the vehicle is in the predetermined state when the ignition switch of the vehicle is in the OFF state and the brake switch, which enters an ON state or an OFF state depending on whether or not the driver performs brake operation, is in the OFF state, or when the ignition switch of the vehicle is in the OFF state and the vehicle body speed of the vehicle is zero. This configuration also makes it possible to more correctly determination that the driver does not have an intention of performing brake operation.

In the case where, as described above, the communication control means is configured to determine that the vehicle is in the predetermined state when at least the ignition switch of the vehicle is in the OFF state, the communication control means is preferably configured in such a manner that when the vehicle body speed of the vehicle assumes a value other than zero during performance of the communication control, the communication control means stops the communication control, brings the pressure-increasing valve in an open state, and brings the pressure-reducing valve in a closed state.

By virtue of the above configuration, in a case where the vehicle starts moving, for example, because the vehicle was parked on a sloped road, the communication control is stopped, the pressure-increasing valve is brought into the open state, and the pressure-reducing valve is brought into the closed state. Therefore, it becomes possible for the driver (a person who was the driver) to generate within the wheel cylinder a proper brake hydraulic pressure corresponding to the brake operation, thereby again stopping the vehicle and reliably maintaining the vehicle in a stopped state.

The communication control means is configured to change the predetermined time, over which the communication control is performed, in accordance with the total drive time of the hydraulic pump as measured from a point in time at which the previously performed communication control has ended. The magnitude of negative pressure within the secondary circuit at (immediately before) the point in time at which the communication control is performed tends to increase with the total drive time of the hydraulic pump as measured from a point in time at which the previously performed communication control has ended. Meanwhile, in order to reliably eliminate the negative pressure within the secondary circuit, the duration of the communication control (that is, the predetermined time) is preferably increased with the magnitude of the negative pressure. Accordingly, when the above-described configuration is employed, the predetermined time can be increased with the total drive time of the hydraulic pump. As a result, the predetermined time can be set to a proper time, which is neither too long nor too short and which corresponds to the magnitude of the negative pressure within the secondary circuit.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

Figure 1:
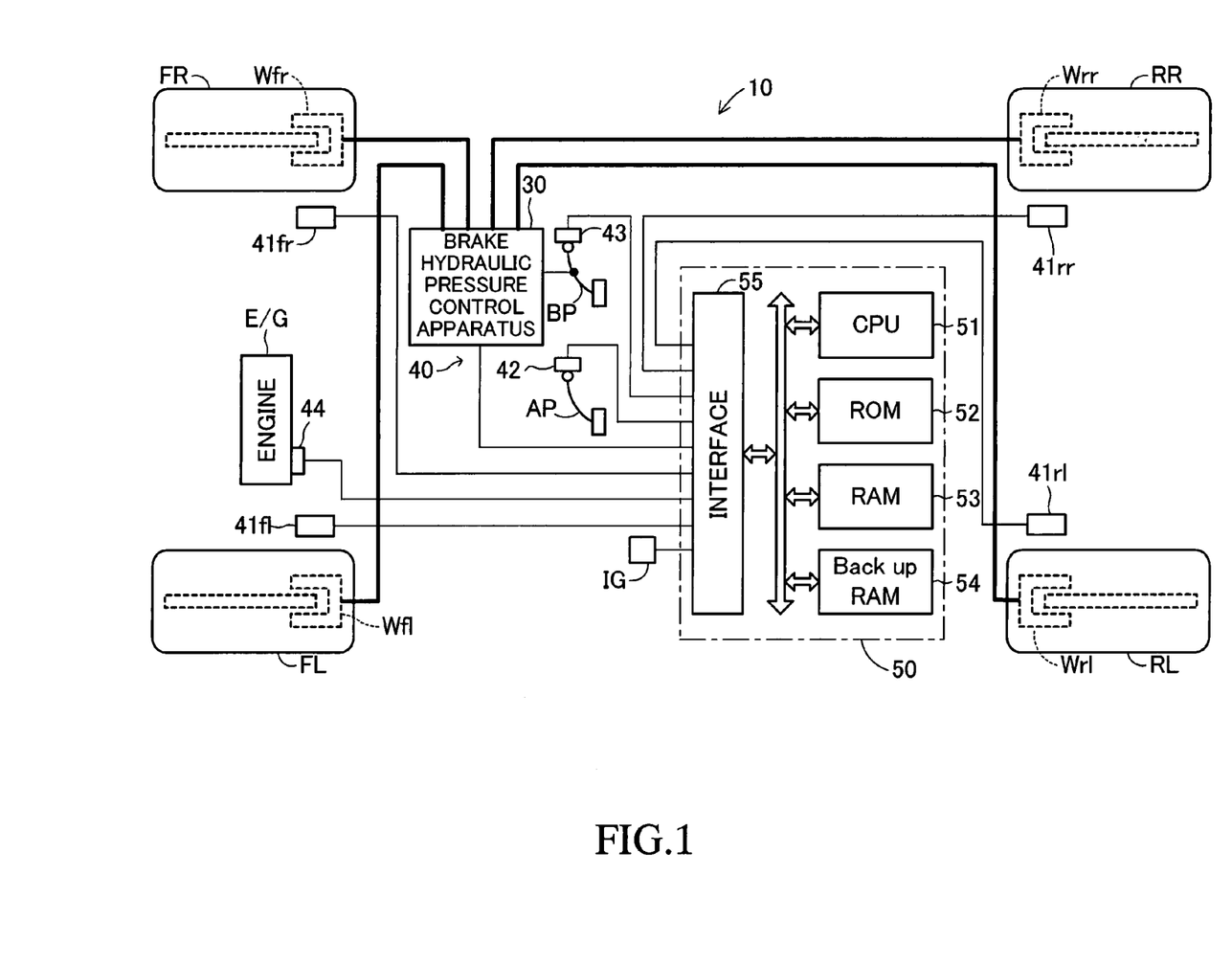
FIG. 1 is a schematic diagram of a vehicle equipped with a brake hydraulic pressure control apparatus for a vehicle according to an embodiment of the present invention.

An embodiment of the present invention will be described with reference to the drawings. FIG. 1 schematically shows the structure of a vehicle equipped with a brake hydraulic pressure control apparatus 10 according to the embodiment of the present invention. The illustrated vehicle is a four-wheel, rear-wheel drive (FR) vehicle having two front wheels (a front left wheel FL and a front right wheel FR), which are non-drive wheels (follower wheels), and two rear wheels (a rear left wheel RL and a rear right wheel RR), which are drive wheels.

This brake hydraulic pressure control apparatus 10 has a brake hydraulic pressure control section 30 for generating a braking force in each wheel by means of brake hydraulic pressure, a sensor section 40, and an electronic controller 50.

Figure 2:
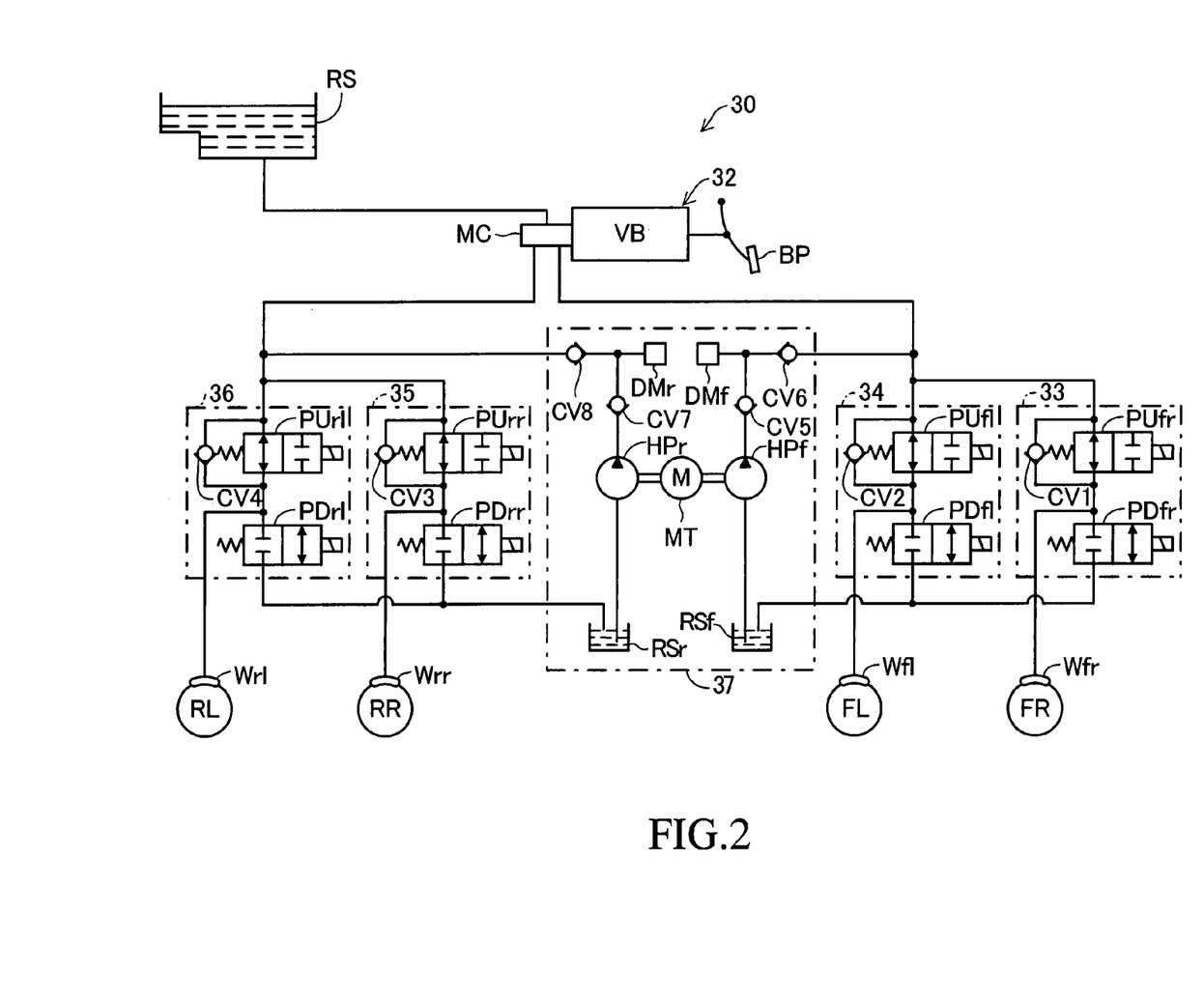
FIG. 2 is a schematic diagram of the brake hydraulic pressure control apparatus shown in FIG. 1.

As schematically shown in FIG. 2, the brake hydraulic pressure control section 30 includes a brake hydraulic pressure generating section 32 which generates brake hydraulic pressure corresponding to the operating force of a brake pedal BP; an FR brake hydraulic pressure adjusting section 33, an FL brake hydraulic pressure adjusting section 34, an RR brake hydraulic pressure adjusting section 35, and an RL brake hydraulic pressure adjusting section 36, which can adjust the brake hydraulic pressures supplied to corresponding wheel cylinders Wfr, Wfl, Wrr, and Wrl respectively installed on the wheels FR, FL, RR, and RL; and a return brake fluid supply section 37.

The brake hydraulic pressure generating section 32 includes a vacuum booster VB which operates in response to operation of the brake pedal BP, and a master cylinder MC which is linked to the vacuum booster VB. The vacuum booster VB utilizes the pressure (negative pressure) of air within an unillustrated intake pipe of an engine E/G so as to boost the operating force of the brake pedal BP by a prescribed ratio and transmits the boosted operating force to the master cylinder MC.

The master cylinder MC has two output ports; i.e., a first port and a second port. The master cylinder MC receives brake fluid from a reservoir RS, and generates from the first port a first master cylinder hydraulic pressure corresponding to the boosted operating force. The master cylinder MC also generates from the second port a second master cylinder hydraulic pressure which is substantially the same as the first master cylinder hydraulic pressure and which corresponds to the boosted operating force. The structures and operations of the master cylinder MC and the vacuum booster VB are well known, and therefore an explanation of the details thereof will be omitted. In this manner, the master cylinder MC and the vacuum booster VB generate first and second master cylinder hydraulic pressures corresponding to the operating force of the brake pedal BP.

The first port of the master cylinder MC is connected to the upstream side of the FR brake hydraulic pressure adjusting section 33 and the upstream side of the FL brake hydraulic pressure adjusting section 34. Similarly, the second port of the master cylinder MC is connected to the upstream side of the RR brake hydraulic pressure adjusting section 35 and the upstream side of the RL brake hydraulic pressure adjusting section 36. Thus, the first master cylinder hydraulic pressure is supplied to the upstream side of the FR brake hydraulic pressure adjusting section 33 and the upstream side of the FL brake hydraulic pressure adjusting section 34, and the second master cylinder hydraulic pressure is supplied to the upstream side of the RR brake hydraulic pressure adjusting section 35 and the upstream side of the RL brake hydraulic pressure adjusting section 36.

The FR brake hydraulic pressure adjusting section 33 consists of a pressure-increasing valve PUfr, which is a normally-open solenoid valve of a 2-port, 2-position type, and a pressure-reducing valve PDfr, which is a normally-closed solenoid valve of a 2-port, 2-position type. When the pressure-increasing valve PUfr is in its first position (a position in a non-excited state) shown in FIG. 2, it establishes communication between the upstream side of the FR brake hydraulic pressure adjusting section 33 and the wheel cylinder Wfr. When the pressure-increasing valve PUfr is in its second position (a position in an excited state), it breaks the communication between the upstream side of the FR brake hydraulic pressure adjusting section 33 and the wheel cylinder Wfr. When the pressure-reducing valve PDfr is in its first position (a position in a non-excited state) shown in FIG. 2, it breaks communication between the wheel cylinder Wfr and a reservoir RSf. When the pressure-reducing valve PDfr is in its second position (a position in an excited state), it establishes the communication between the wheel cylinder Wfr and the reservoir RSf.

With this structure, when the pressure-increasing valve PUfr and the pressure-reducing valve PDfr are in their first positions, the hydraulic pressure in the wheel cylinder Wfr is increased upon supply of pressurized brake fluid from the upstream side of the FR brake hydraulic pressure adjusting section 33 into the wheel cylinder Wfr. When the pressure-increasing valve PUfr is in the second position and the pressure-reducing valve PDfr is in the first position, regardless of the hydraulic pressure in the upstream side of the FR brake hydraulic pressure adjusting section 33, the hydraulic pressure in the wheel cylinder Wfr at the time of changeover is maintained. When the pressure-increasing valve PUfr and the pressure-reducing valve PDfr are in their second positions, the brake fluid within the wheel cylinder Wfr is allowed to return to the reservoir RSf, whereby the hydraulic pressure in the wheel cylinder Wfr is decreased.

A check valve CV1 which allows flow of the brake fluid in only one direction from the wheel cylinder Wfr side to the upstream side of the FR brake hydraulic pressure adjusting section 33 is connected in parallel with the pressure-increasing valve PUfr. As a result, when the brake pedal BP is released after being operated, the brake hydraulic pressure in the wheel cylinder Wfr is rapidly decreased.

Similarly, the FL brake hydraulic pressure adjusting section 34, the RR brake hydraulic pressure adjusting section 35, and the RL brake hydraulic pressure adjusting section 36 comprise a pressure-increasing valve PUfl and a pressure-reducing valve PDfl, a pressure-increasing valve PUrr and a pressure-reducing valve PDrr, and a pressure-increasing valve PUrl and a pressure-reducing valve PDrl, respectively. By controlling the positions of each pressure-increasing valve and pressure-reducing valve, the brake hydraulic pressure in the wheel cylinder Wfl, the wheel cylinder Wrr, and the wheel cylinder Wrl can be increased, maintained, or decreased. Checks valves CV2, CV3, and CV4 are provided in parallel with the pressure-increasing valves PUfl, PUrr, and PUrl, respectively, to provide the same function as that of the check valve CV1.

The return brake fluid supply section 37 includes a DC motor MT, and two hydraulic pumps HPf and HPr simultaneously driven by the motor MT. The hydraulic pump HPf pumps the brake fluid returned from the pressure reducing values PDfr and PDfl to the reservoir RSf, and supplies the pumped brake fluid to the upstream sides of the FR brake hydraulic pressure adjusting section 33 and the FL brake hydraulic pressure adjusting section 34 via check valves CV5 and CV6.

Similarly, the hydraulic pump HPr pumps the brake fluid returned from the pressure reducing values PDrr and PDrl to the reservoir RSr, and supplies the pumped brake fluid to the upstream sides of the RR brake hydraulic pressure adjusting section 35 and the RL brake hydraulic pressure adjusting section 36 via check valves CV7 and CV8. Notably, in order to reduce pulsations of discharge pressures of the hydraulic pumps HPf and HPr, dampers DMf and DMr are disposed in a hydraulic circuit between the check valves CV5 and CV6 and a hydraulic circuit between the check valves CV7 and CV8, respectively.

A hydraulic circuit extending from the first port of the master cylinder MC to the pressure-increasing valves PUfr and PUfl and a hydraulic circuit extending from the second port of the master cylinder MC to the pressure-increasing valves PUrr and PUrl correspond to the above-described primary circuit. A hydraulic circuit extending from the pressure-reducing valves PDfr and PDfl to the reservoir RSf, a hydraulic circuit extending from the reservoir RSf to the hydraulic pump HPf (the inlet side thereof), a hydraulic circuit extending from the pressure-reducing valves PDrr and PDrl to the reservoir RSr, and a hydraulic circuit extending from the reservoir RSr to the hydraulic pump HPr (the inlet side thereof) correspond to the above-described secondary circuit.

With the structure described above, when all the solenoid valves are in their first positions, the brake hydraulic pressure control section 30 supplies to each wheel cylinder a brake hydraulic pressure corresponding to the operating force of the brake pedal BP. In this state, it become possible to decrease only the brake hydraulic pressure in, for example, the wheel cylinder Wrr by a prescribed amount through control of the pressure-increasing valve PUrr and the pressure-reducing valve PDrr. That is, the brake hydraulic pressure control section 30 can individually decrease the brake hydraulic pressure in the wheel cylinder of each wheel from the brake hydraulic pressure corresponding to the operating force of the brake pedal BP.

Referring back to FIG. 1, the sensor section 40 includes wheel speed sensors 41*fl*, 41*fr*, 41*rl*, and 41*rr* which each output a signal having a pulse each time the corresponding wheel rotates by a prescribed angle; an accelerator pedal sensor 42 for detecting operation amount of an accelerator pedal AP and for outputting a signal indicative of the accelerator pedal operation amount Accp; a brake switch 43 which enters an ON state or an OFF state in response to operation of a brake pedal BP or release thereof; and a rotational speed sensor 44 for detecting rotational speed of the engine E/G, which serves as a drive source of the vehicle, AP and for outputting a signal indicative of the engine rotational speed NE.

The electronic controller 50 is a microcomputer which includes a CPU 51; ROM 52 in which are previously stored routines (programs) to be executed by the CPU 51, tables (look-up tables and maps), constants, and the like; RAM 53 in which the CPU 51 temporarily stores data as necessary; backup RAM 54 which stores data when the power supply is on and which maintains the stored data when the power supply is cut off; an interface 55 containing A/D converters; and the like. The above components are interconnected via a bus.

The interface 55 is connected to the above sensors, etc. 41 to 44 and supplies signals from the sensors, etc. 41 to 44 to the CPU 51, and it outputs drive signals to each of the solenoid valves and the motor MT of the brake hydraulic pressure control section 30, and a power transistor Tr, which will be described later, in accordance with instructions from the CPU 51.

The brake hydraulic pressure control section 30 (CPU 51) executes the above-described ABS control, which is the control of properly decreasing the brake hydraulic pressure for a specific wheel from the brake hydraulic pressure corresponding to the operating force of the brake pedal BP, when the specific wheel tends to lock while the driver is operating the brake pedal BP. Since the details of the ABS control are well known, a repeated description therefor will be omitted.

Outline of Hydraulic Pump Drive Control

Brake fluid consumed as a result of performance of ABS control; i.e., brake fluid that flows into the reservoir RSf via the pressure-reducing valves PDfr and PDfl and bake fluid that flows into the reservoir RSr via the pressure-reducing valves PDrr and PDrl, must be returned, without fail, to the corresponding primary circuit.

In view of the above, the brake hydraulic pressure control apparatus 10 according to the embodiment of the present invention (hereinafter may be referred to as the "present apparatus") drives and controls the motor MT in order to drive the hydraulic pumps HPf and HPr over a period between start of the ABS control and end of the ABS control and continues the drive of the hydraulic pumps HPf and HPr (accordingly, the drive control for the motor MT) until a predetermined period of time elapses after the end of the ABS control in a state in which all the solenoid valves of the brake hydraulic pressure control section 30 have entered their non-excited states (accordingly, all the pressure-reducing valves PD are in their closed states).

Further, in order to perform so-called initial check immediately after an ignition switch IG is brought from an OFF state to an ON state, the present apparatus drives the hydraulic pumps HPf and HPr (accordingly, the motor MT) over a predetermined initial check time Tini while maintaining all the solenoid valves of the brake hydraulic pressure control section 30 in their non-excited states (accordingly, all the pressure-reducing valves PD are in their closed states).

Figure 3:
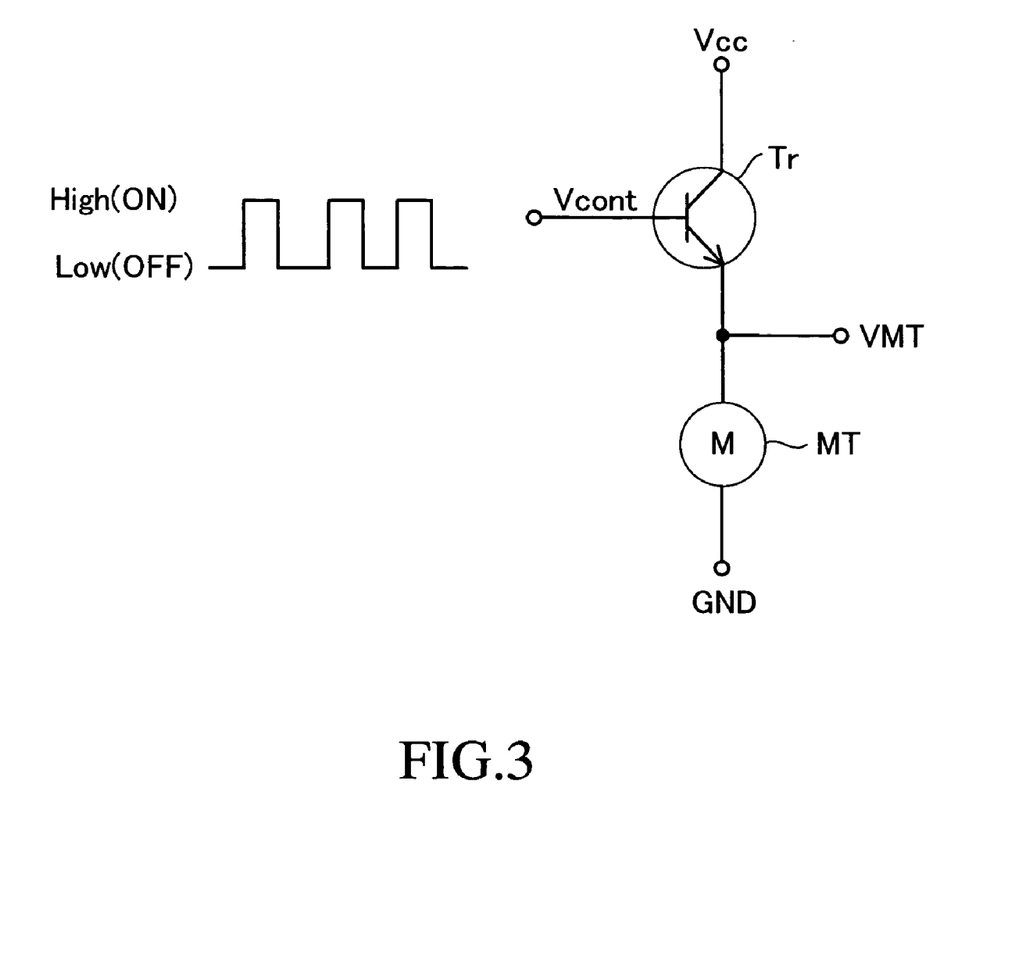
FIG. 3 is a schematic diagram of a drive circuit for driving and controlling a motor MT shown in FIG. 2.

The drive control for the motor MT for driving the hydraulic pumps HPf and HPr is performed through utilization of the power transistor (switching element) Tr shown in FIG. 3 and incorporated in the electronic controller 50.

More specifically, as shown in FIG. 3, the collector terminal of the power transistor Tr is connected to the power source (voltage: Vcc (12 V in the present example)) of the vehicle, and the emitter terminal of the power transistor Tr is connected to one terminal of the motor MT. The other terminal of the motor MT is grounded (voltage: GND level). A motor control signal Vcont, which is generated in accordance with an instruction from the present apparatus (CPU 51), is applied to the base terminal of the power transistor Tr.

As shown in FIG. 3, the motor control signal Vcont is generated to assume a High level or a Low level. The power transistor Tr is in an on state when the motor control signal Vcont is at the High level, and is in an off state when the motor control signal Vcont is at the Low level. In other words, when the motor control signal Vcont is at the High level, the voltage Vcc is applied to the motor MT, whereby the motor MT drives the hydraulic pumps HPf and HPr, and when the motor control signal Vcont is at the Low level, the voltage Vcc is not applied to the motor MT.

As a result, when the motor control signal Vcont is at the High level, a motor inter-terminal voltage VMT (see FIG. 3), which is a voltage between the two terminals of the motor MT, becomes constant (voltage Vcc). Meanwhile, when the motor control signal Vcont is at the Low level, a voltage generated by the motor MT is output as the motor inter-terminal voltage VMT. The voltage generated by the motor MT is an induced voltage or electromotive force which the motor MT generates as a result of acting as a generator. The generated voltage decreases with the rotational speed of the motor MT, which continues rotation because of inertia, and becomes zero when the rotational speed becomes zero.

The present apparatus performs the following control. When the motor inter-terminal voltage VMT (accordingly, the generated voltage) becomes equal to or less than a voltage threshold VMTTH, which serves as a predetermined threshold, in a state in which the motor control signal Vcont is at the Low level, the present apparatus switches the motor control signal Vcont from the Low level to the High level, and maintains the motor control signal Vcont at the High level for a predetermined period of time after the switching so as to drive the hydraulic pumps HPf and HPr. Subsequently, the present apparatus switches the motor control signal Vcont from the High level to the Low level so as to stop the drive of the hydraulic pumps HPf and HPr.

In this state (the motor control signal Vcont is at the Low level), the motor inter-terminal voltage VMT (accordingly, the generated voltage) decreases with the rotational speed of the motor MT, which continues rotation because of inertia. When the motor inter-terminal voltage VMT becomes equal to or less than the voltage threshold VMTTH, the present apparatus again switches the motor control signal Vcont from the Low level to the High level. Through repetition of such an operation within a period in which the hydraulic pumps HPf and HPr are to be driven, the present apparatus starts and stops the supply of electricity to the motor MT, to thereby control the rotational speed of the motor MT. Thus, the drive control for the hydraulic pumps HPf and HPr is performed. The above is the outline of the drive control for the hydraulic pumps HPf and HPr.

Outline of Communication Control

As described previously, at a point in time when the drive control for the hydraulic pumps HPf and HPr is ended after completion of the above-described ABS control or at the time of initial check, a negative pressure may be generated within the secondary circuit, and when the ABS control or the initial check is performed repeatedly (in particular, when only the initial check is performed repeatedly), the magnitude of the negative pressure increases each time, with the result that air may be generated in the secondary circuit because of cavitation.

A conceivable measure for preventing the generation of air within the secondary circuit (that is, an increase in the magnitude of the negative pressure) is to open both the pressure-increasing valve PU and the pressure-reducing valve PD for the same wheel at an appropriate timing so as to establish communication between the primary circuit and the secondary circuit, to thereby forcibly equalize the brake hydraulic pressure within the secondary circuit with that within the primary circuit. However, if a driver operates the brake pedal BP during a period in which communication is established between the primary circuit and the secondary circuit, a proper brake hydraulic pressure corresponding to the brake pedal operation may fail to be generated within the wheel cylinders.

In view of the above, whenever the vehicle enters a state corresponding to any one of three assumed cases in which the driver is considered not to intend to perform brake pedal operation, the present apparatus performs communication control adapted to excite or drive all the (four) pressure-reducing valves PD (that is, to bring them into their open states) over a predetermined communication time. When the vehicle is in a state corresponding to any one of the thee cases, since the brake pedal BP is not operated and ABS control is not performed, all the (four) pressure-increasing valves PU are in their non-excited states (that is, in their open states). Accordingly, the above-described communication control establishes communication between the primary circuit and the secondary circuit when the driver does not operate the brake pedal BP. The "three cases" will now be described one at a time.

<Case in which the Vehicle Starts>

When the vehicle starts, the driver is considered not to have an intention of performing brake pedal operation. Accordingly, the present apparatus performs the above-described communication control every time the vehicle starts. The "start of the vehicle" can be detected on the basis of an estimated vehicle body speed Vso, which will be described later.

<Case in which the Vehicle is in an Accelerating State>

When the vehicle is in an accelerating state, the driver is considered not to have an intention of performing brake pedal operation. Accordingly, the present apparatus performs the above-described communication control every time the vehicle enters an accelerating state. "Entering an accelerating state" can be detected on the basis of the output of the brake switch 43, an estimated vehicle body acceleration DVso, which will be described later, and the output of the acceleration pedal sensor 42.

<Case in which the Ignition Switch IG is in the OFF State>

When the ignition switch IG is in the OFF state, as described previously, the vehicle is generally in a state in which the vehicle can be maintained in a stopped state without need for brake pedal operation, and the driver (a person who was the driver) is considered not to have an intention of performing brake pedal operation. Accordingly, the present apparatus performs the above-described communication control when the ignition switch IG is in the OFF state (in the present embodiment, when a predetermined period elapses after switching of the ignition switch IG from the ON state to the OFF state, with the ignition switch IG maintained in the OFF state (and when the predetermined conditions regarding the output of the brake switch 43 and the estimated vehicle body speed Vso are satisfied)). In this case, when the vehicle starts to move during performance of the above-described communication control (specifically, the estimated vehicle body speed Vso assumes a value other than "0"), the present apparatus immediately stops the communication control, and immediately brings all the (four) pressure-reducing valves PD into their non-excited states (that is, into their closed states). As a result, all the pressure-increasing valves PU are in their open states, and the pressure-reducing valves PD are in their closed states, to thereby enable generation of a proper brake hydraulic pressure corresponding to the driver's brake pedal operation.

As described above, the present apparatus performs the communication control over a predetermined communication time whenever the vehicle enters a state corresponding to any one of the "three cases." The communication time is set to be in direct proportion to the total drive time of the hydraulic pumps HPf and HPr as measured from a point in time at which the previously performed communication control has ended. The above is the outline of the communication control.

Actual Operation

The actual operation of the brake hydraulic pressure control apparatus 10 according to the present invention having the above-described structure will be explained while referring to FIGS. 4 to 8, which show, in the form of flowcharts, routines which are executed by the CPU 51 of the electronic controller 50. In the following description, the symbol  appended to various variables and the like collectively represents the symbols fl, fr, rl, and rr and indicates that the particular variable or the like applies to all of the wheels FR, FL, etc. of the vehicle. For example, the wheel speed Vw collectively indicates the front left wheel speed Vwfl, the front right wheel speed Vwfr, the rear left wheel speed Vwrl, and the rear right wheel speed Vwrr.

Figure 4:
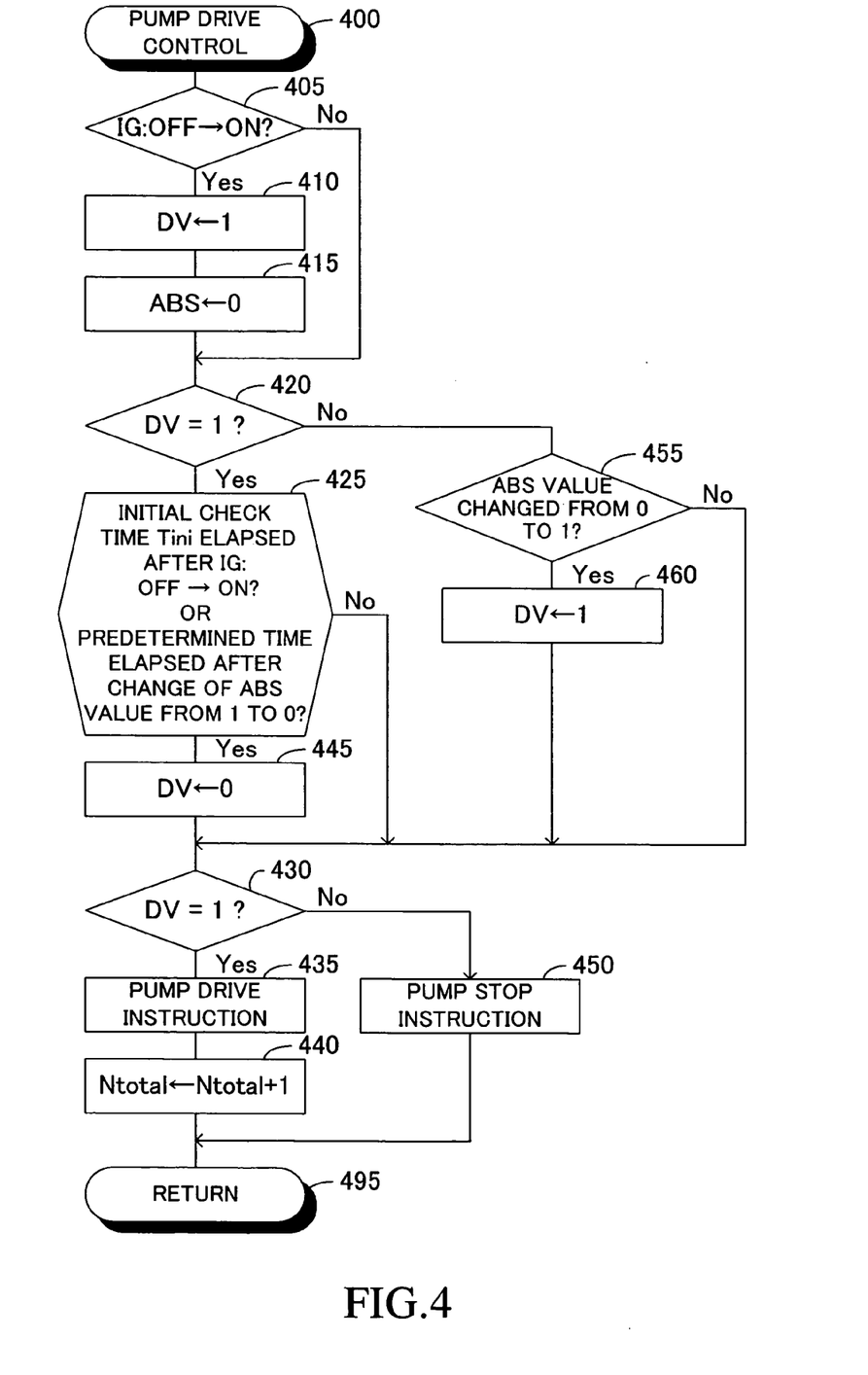
FIG. 4 is a flowchart showing a routine which the CPU shown in FIG. 1 executes in order to perform drive control for a hydraulic pump.
Figure 5:
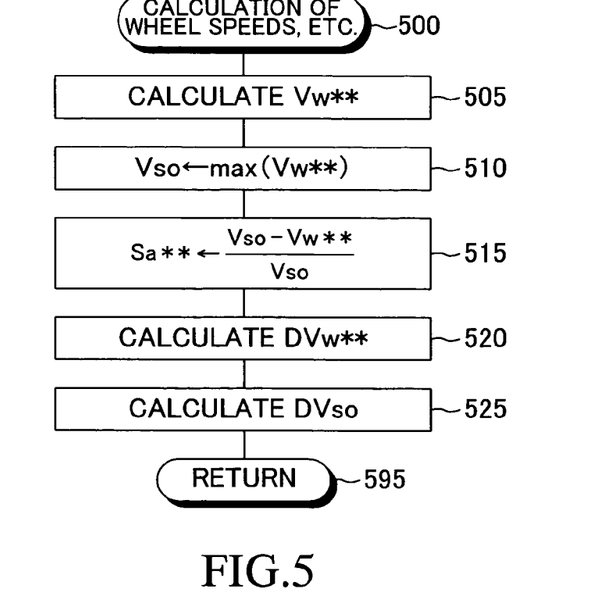
FIG. 5 is a flowchart showing a routine which the CPU shown in FIG. 1 executes in order to calculate wheel speed, etc.
Figure 6:
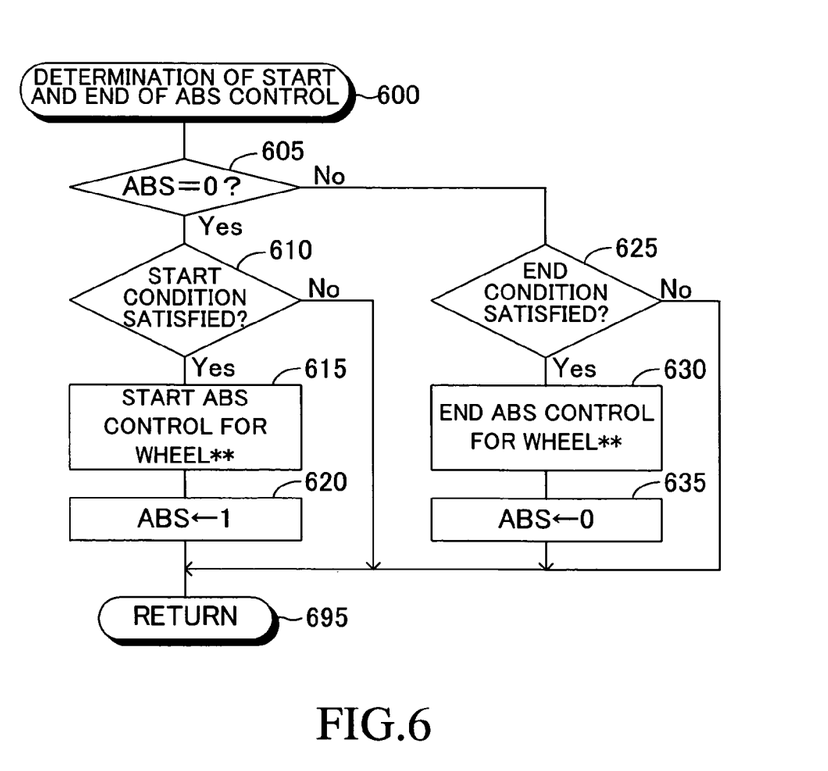
FIG. 6 is a flowchart showing a routine which the CPU shown in FIG. 1 executes in order to perform judgment on start and end of ABS control.
Figure 7:
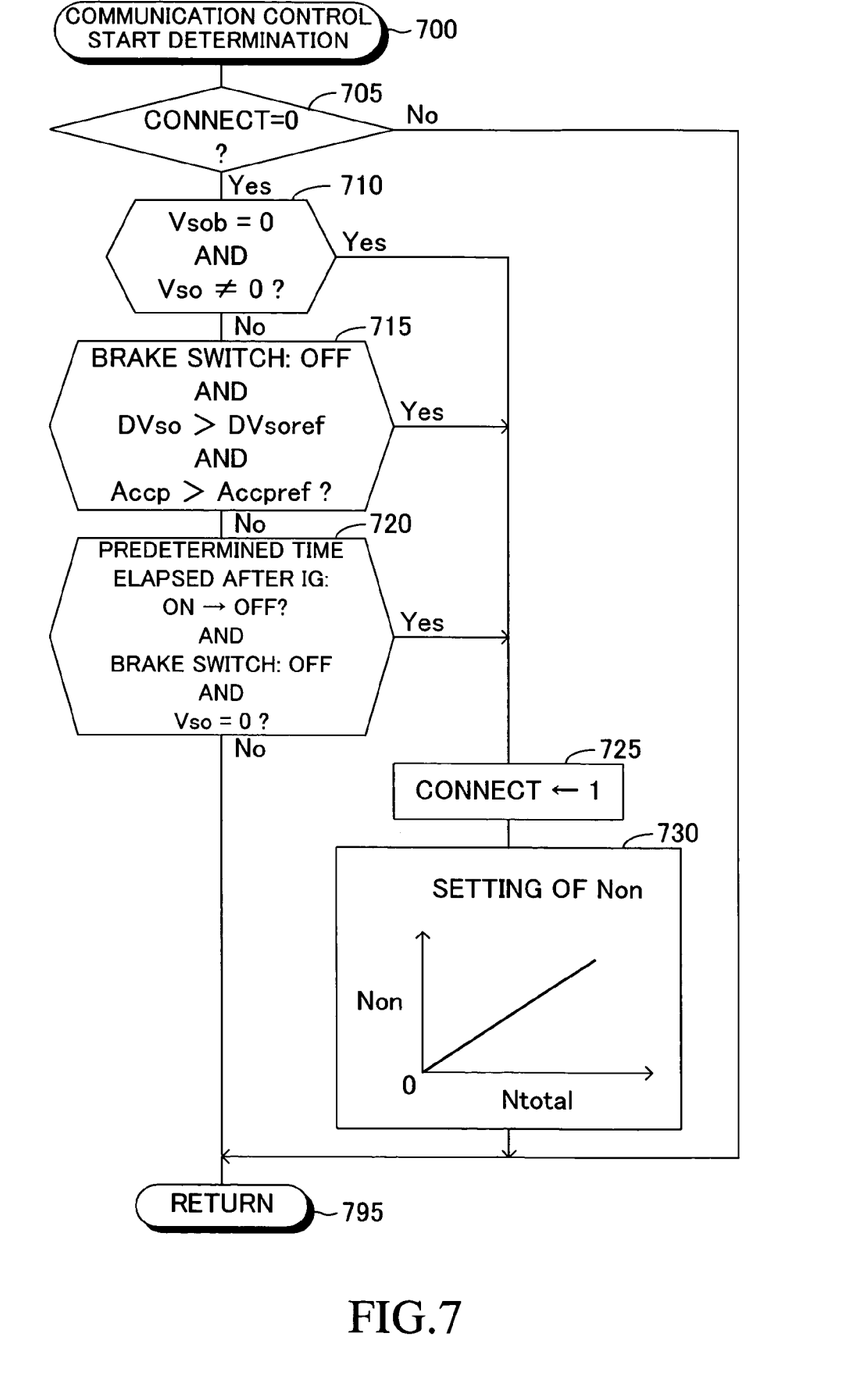
FIG. 7 is a flowchart showing a routine which the CPU shown in FIG. 1 executes in order to perform judgment on start of communication control.
Figure 8:
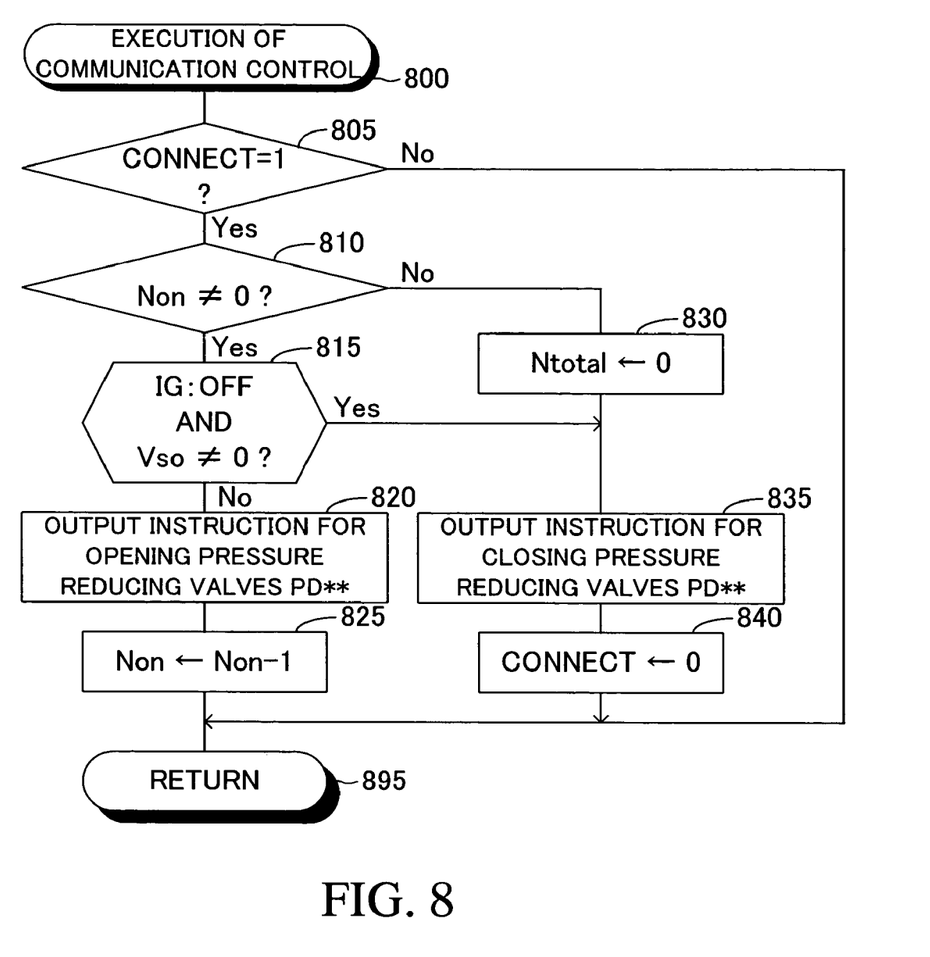
FIG. 8 is a flowchart showing a routine which the CPU shown in FIG. 1 executes in order to perform the communication control.

The routines shown in FIGS. 4 and 6 are executed only during periods in which the ignition switch IG is in the ON state. The routines shown in FIGS. 5, 7, and 8 are executed not only during periods in which the ignition switch IG is in the ON state, but also after the ignition switch IG is switched from the ON state to the OFF state and until completion of the communication control which is performed in a state in which the ignition switch IG is in the OFF state.

At predetermined time intervals, the CPU 51 repeatedly performs a routine shown in FIG. 4 for performing hydraulic pump drive control. Accordingly, when a predetermined timing is reached, the CPU 51 starts processing of the routine from Step 400, and proceeds to Step 405 so as to determine whether the ignition switch IG has been switched from the OFF state to the ON state.

Here, the description is continued on the assumption that a present point in time is immediately after the ignition switch IG has been switched from the OFF state to the ON state. In this case, the CPU 51 makes a "Yes" determination in Step 405, and proceeds to Step 410 so as to set the value of a pump drive execution flag DV to "1." In Step 415 subsequent thereto, the CPU 51 sets the value of an ABS control execution flag ABS to "0." The pump drive execution flag DV represents that the pump drive control is currently executed when its value is "1," and that the pump drive control is not currently executed when its value is "0."

The ABS control execution flag ABS represents that the ABS control is currently executed when its value is "1," and that the ABS control is not currently executed when its value is "0."

Subsequently, the CPU 51 proceeds to Step 420 in order to determine whether the pump drive execution flag DV is "1." Since the pump drive execution flag DV is "1" at the present point in time, the CPU 51 makes a "Yes" determination in Step 420, and proceeds to Step 425. In Step 425, the CPU 51 determines whether the above-described initial check time Tini has elapsed, with the ignition switch IG maintained in the ON state, after the ignition switch is switched form the OFF state to the ON state, and whether a predetermined period of time has elapsed after the value of the ABS control execution flag ABS is changed from "1" to "0."

Since the present point in time is immediately after the ignition switch has been switched from the OFF state to the ON state, and the value of the ABS control execution flag ABS is maintained at "0," the CPU 51 makes a "No" determination in Step 425, and proceeds to Step 430.

In Step 430, the CPU 51 determines whether the pump drive execution flag DV is "1." Since the pump drive execution flag DV is "1" at the present point in time, the CPU 51 makes a "Yes" determination in Step 430, and proceeds to Step 435 in order to output a pump drive instruction to the motor MT. As a result, execution of the drive control for the hydraulic pumps HPf and HPr is started.

Subsequently, the CPU 51 increments a counter value Ntotal by "1" (Step 440), and then proceeds to Step 495 so as to end the present routine. The counter value Ntotal is a value (integer) which represents the total drive time of the hydraulic pumps HPf and HPr as measured from the point in time when the previously executed communication control has ended, and is stored and memorized in the backup RAM 54 in a period in which the ignition switch IG is in the OFF state.

After that, until the initial check time Tini elapses, the CPU 51 repeatedly executes the processing in Steps 400, 405, 420, 425, and 430 to 440. As a result, the drive control for the hydraulic pumps HPf and HPr is continued for the initial check time Tini by the processing in Step 435, and in step 440, the counter value Ntotal is incremented by an amount corresponding to the initial check time Tini.

When the initial check time Tini has elapsed, the CPU 51 makes a "Yes" determination when it proceeds to Step 425. As a result, the CPU 51 proceeds to Step 445 so as to change the value of the pump drive execution flag DV from "1" to "0," and then proceeds to Step 430. The CPU 51 makes a "No" determination when it proceeds to Step 430, and then proceeds to Step 450 so as to output a pump stop instruction to the motor MT. As a result, the drive control for the hydraulic pumps HPf and HPr for the initial check is ended, and the increment of the counter value Ntotal is stopped.

After that point in time, since the value of the pump drive execution flag DV is maintained at "0," the CPU 51 makes a "No" determination when it proceeds to Step 420, and then proceeds to Step 455 so as to determine whether the value of the ABS control execution flag ABS has changed from "0" to "1." Since the value of the ABS control execution flag ABS is maintained at "0" unless the ABS control is started after start of a travel of the vehicle, the CPU 51 makes a "No" determination in Step 455, and then proceeds to Steps 430 and 450, whereby the drive of hydraulic pumps HPf and HPr is continuously stopped.

Next, an operation of the CPU 51 for calculating wheel speeds Vw, etc., will be described. The CPU 51 repeatedly performs a routine shown in FIG. 5 at predetermined time intervals. Accordingly, when a predetermined timing is reached, the CPU 51 starts processing of the routine from Step 500, and proceeds to Step 505 so as to calculate the wheel speed Vw of the wheel (the speed of the outer periphery of the wheel). Specifically, the CPU 51 calculates the wheel speed Vw on the basis of the time intervals between pulses of a signal which each wheel speed sensor 41** outputs.

Next, the CPU 51 proceeds to Step 510 and calculates the highest value among the wheel speeds Vw as the estimated vehicle body speed Vso. Alternatively, the average of the wheel speeds Vw may be calculated as the estimated vehicle body speed Vso. Subsequently, the CPU 51 proceeds to Step 515 and calculates the actual slip rate Sa of the wheel on the basis of the value of the estimated vehicle body speed Vso calculated in Step 510, the value of the wheel speed Vw** calculated in Step 505, and the equation shown in Step 515.

Subsequently, the CPU 51 proceeds to Step 520 and calculates the wheel acceleration DVw of the wheel, which is a time-differentiated value of the wheel speed Vw**, in accordance with the following Eq. 1. In Step 525 subsequent to Step 520, the CPU 51 calculates the estimated vehicle body acceleration DVso, which is a time-differentiated value of the estimated vehicle body speed Vso calculated in Step S510, in accordance with the following Eq. 2. Subsequently, the CPU 51 proceeds to Step 595 so as to end the present routine. After that, the CPU 51 repeatedly executes the present routine.

$$DVw^{} = (Vw^{} - Vwb^{**})/\Delta t \quad \text{Eq. 1}$$

$$DVso = (Vso - Vsob)/\Delta t \quad \text{Eq. 2}$$

In Eq. 1, Vwb represents the wheel speed Vw calculated in Step 505 during the previous execution of the present routine, and Δt represents the length of the above-described, predetermined intervals (the computation cycles of the CPU 51). In Eq. 2, Vsob represents the estimated vehicle body speed Vso calculated in Step 510 during the previous execution of the present routine.

Next, operation for determining start and end of ABS control will be described. The CPU 51 repeatedly performs a routine shown in FIG. 6 at predetermined time intervals. Accordingly, when a predetermined timing is reached, the CPU 51 starts processing of the routine from Step 600, and proceeds to Step 605 so as to determine whether the value of the ABS control execution flag ABS is "0."

The description will be continued on the assumption that the ABS control is currently halted, and ABS control start conditions, which will be described later, have not been satisfied. In this case, since the value of the ABS control execution flag ABS has been set to "0," the CPU 51 makes a "Yes" determination in Step 605, and then proceeds to Step 610 in order to determine whether the ABS control start conditions are satisfied. The ABS control start conditions are satisfied when, for example, the absolute value of the latest wheel acceleration DVw of a specific wheel (at least one wheel) calculated in the previous Step 520 (wheel deceleration |DVw|) is greater than a predetermined deceleration reference value DVwref (positive value), and the latest actual slip rate Sa of the specific wheel calculated in the previous Step 515 is greater than a predetermined slip rate reference value Sref (positive value).

At the present stage, as described above, the ABS control start conditions are not satisfied. Therefore, the CPU 51 makes a "No" determination in Step 610, and immediately proceeds to Step 695 in order to end the present routine. After that, until the ABS control start conditions are satisfied, the CPU 51 repeatedly executes the processing in Steps 600 to 610 and Step 695 at the predetermined intervals. Since the value of the ABS control execution flag ABS is maintained at "0" at this stage, the drive of the hydraulic pumps HPf and HPr is continuously stopped as described above.

Next, the description will be continued on the assumption that the ABS control start conditions are satisfied in this state. In this case, the CPU 51 makes a "Yes" determination when it proceeds to Step 610, and then proceeds to Step 615 in order to start ABS control for a wheel** corresponding to the specific wheel. In Step 620 subsequent to Step 615, the CPU 51 sets the value of the ABS control execution flag ABS to "1." After that, the CPU 51 proceeds to Step 695 so as to end the present routine.

Since the value of the ABS control execution flag ABS has been set to 1, the CPU 51 makes a "Yes" determination when it proceeds to Step 455 in FIG. 4, and then proceeds to Step 460 so as to change the value of the pump drive execution flag DV from "0" to "1." As a result, the CPU 51 proceeds to Steps 430 and 435 so as to start execution of the drive control for the hydraulic pumps HPf and HPr, and then proceeds to Step 440 in order to start incrementing of the counter value Ntotal. After that, until a predetermined period of time elapses after the value of the ABS control execution flag ABS has been changed from "1" to "0" (accordingly, after completion of the ABS control), the value of the pump drive execution flag DV is maintained at "1." Therefore, the drive control for the hydraulic pumps HPf and HPr is continued in Step 435, and the counter value Ntotal is incremented in Step 440.

Again referring to FIG. 6, since the ABS control execution flag ABS has been set to "1" as a result of the processing in Step 620, the CPU 51 makes a "No" determination when it proceeds to Step 605, and then proceeds to Step 625 in order to determine whether predetermined ABS control end conditions are satisfied. Since the present stage is immediately after the ABS control has been started, the ABS control end conditions are not satisfied. Therefore, the CPU 51 makes a "No" determination in Step 625, and immediately proceeds to Step 695 in order to end the present routine.

After that, until the ABS control end conditions are satisfied, the CPU 51 repeatedly executes the processing in Steps 600, 605, 625, and 695 at the predetermined intervals. In other words, the value of the ABS control execution flag ABS is maintained at "1" during execution of the ABS control.

Next, the description will be continued on the assumption that the ABS control end conditions are satisfied in this state. In this case, the CPU 51 makes a "Yes" determination when it proceeds to Step 625, and then proceeds to Step 630 in order to stop the ABS control performed for all the wheels**. In Step 635 subsequent to Step 630, the CPU 51 sets the value of the ABS control execution flag ABS to "0." After that, the CPU 51 proceeds to Step 695 so as to end the present routine.

Since the ABS control execution flag ABS has been set to "0" as a result of the processing in Step 635, the CPU 51 makes a "Yes" determination when it proceeds to Step 605, and then proceeds to Step 610 in order to again perform monitoring for determining whether the ABS control start conditions are satisfied. Until the ABS control start conditions are again satisfied, the CPU 51 repeatedly executes the processing in Steps 600 to 610 and 695. In other words, the value of the ABS control execution flag ABS is maintained at "0" while the ABS control is stopped.

When a predetermined period of time elapses after completion of the ABS control (accordingly after the point in time when the value of the ABS control execution flag ABS has changed from "1" to "0," the CPU 51 makes a "Yes" determination when its proceeds to Step 425 of FIG. 4, and then proceeds to Step 445 so as to change the value of the pump drive execution flag DV from "1" to "0." As a result, the CPU 51 proceeds to Steps 430 and 450 so as to end the drive control for the hydraulic pumps HPf and HPr and stop the incrementing of the counter value Ntotal. After that, since the value of the pump drive execution flag DV is maintained at "0" until the value of the ABS control execution flag ABS again changes from "0" to "1," the drive of the hydraulic pumps HPf and HPr is continuously stopped by means of the processing in Step 450.

Next, an operation of the CPU 51 for making determination on start of communication control will be described. The CPU 51 repeatedly performs a routine shown in FIG. 7 at predetermined time intervals. Accordingly, when a predetermined timing is reached, the CPU 51 starts processing of the routine from Step 700, and proceeds to Step 705 so as to determine whether the value of a communication control execution flag CONNECT is "0." When the CPU 51 makes a "No" determination, the CPU 51 proceeds directly Step 795 so as to end the present routine. The communication control execution flag CONNECT indicates that the communication control is currently executed when its value is "1," and that the communication control is currently stopped when its value is "0."

Here, it is assumed that the value of the communication control execution flag CONNECT is "0." In this case, the CPU 51 makes a "Yes" determination in Step 705, and proceeds to Step 710 so as to determine whether the previous estimated vehicle body speed Vsob calculated in Step 510 of FIG. 5 is "0" and the present estimated vehicle body speed Vso calculated in Step 510 is not "0" (accordingly, whether the vehicle has started).

When the CPU 51 makes a "No" determination in Step 710, the CPU 51 proceeds to Step 715 so as to determine whether the following three conditions are satisfied simultaneously; (1) the brake switch 43 is in the OFF state, (2) the estimated vehicle body acceleration DVso calculated in Step 525 of FIG. 5 is greater than a predetermined value DVsoref, and (3) the accelerator pedal operation amount Accp is greater than a predetermined amount Accpref (accordingly, whether the vehicle is in an accelerating state).

When the CPU 51 makes a "No" determination in Step 715, the CPU 51 proceeds to Step 720 so as to determine whether the following three conditions are satisfied simultaneously; (1) a predetermined period of time has elapsed, with the ignition switch IG maintained in the OFF state, after the ignition switch is switched from the ON state to the OFF state, (2) the brake switch 43 is in the OFF state, and (3) the estimated vehicle body speed Vso is "0" (accordingly, whether the ignition switch IG is in the OFF state).

When the CPU 51 makes a "No" determination in Step 720 (accordingly, when the CPU 51 makes a "No" determination in all of Steps 710, 715, and 720), the CPU 51 proceeds directly to Step 795 so as to end the present routine. As a result, the value of the communication control execution flag CONNECT is maintained at "0." After that, so long as the value of the communication control execution flag CONNECT is maintained at "0," the CPU 51 makes a "Yes" determination in Step 705, and continuously determines, through monitoring, whether any of the set of conditions of Step 710, the set of conditions of Step 715, and the set of conditions of Step 720 is satisfied.

When the CPU 51 makes a "Yes" determination in any of Steps 710, 715, and 720, the CPU 51 proceeds to Step 725 so as to change the value of the communication control execution flag CONNECT from "0" to "1." Subsequently, in Step 730, the CPU 51 sets a counter value Non on the basis of the latest counter value Ntotal updated in Step 440 of FIG. 4 and a table shown, in the form of a graph, in the box of Step 730. After that, the CPU 51 proceeds to Step 795 so as to end the present routine. The counter value Non is a value indicating the above-described communication time (more specifically, a value indicating the remaining time up to the end of the communication time).

As a result, the counter value Non is set as a value (integer) that is substantially directly proportional to the latest counter value Ntotal. Further, after that point in time, since the value of the communication control execution flag CONNECT is maintained at "1," the CPU 51 makes a "No" determination in Step 705, and proceeds directly to Step 795 so as to end the present routine.

Further, at predetermined time intervals, the CPU 51 repeatedly performs a routine shown in FIG. 8 for executing the communication control. Accordingly, when a predetermined timing is reached, the CPU 51 starts processing of the routine from Step 800, and proceeds to Step 805 so as to determine whether the value of the communication control execution flag CONNECT is "1."

Here, it is assumed that the present point in time is immediately after the processing in Step 725 has been executed as a result of satisfaction of either the set of conditions of Step 710 or the set of conditions of Step 715 (accordingly, the ignition switch IG is in the ON state, and the vehicle is traveling), and the counter value Non is greater than "0." In this case, since the value of the communication control execution flag CONNECT is maintained at "1," the CPU 51 makes a "Yes" determination in Step 805, and then proceeds to Step 810 so as to determine whether the condition of the counter value Non being not "0" is satisfied.

At the present point in time, since the counter value Non is greater than "0," the CPU 51 makes a "Yes" determination in Step 810, and proceeds to Step 815 so as to determine whether the following two conditions are satisfied simultaneously; (1) the ignition switch IG is in the OFF state and (2) the estimated vehicle body speed Vso is not "0." Since the ignition switch IG is in the ON state at the present point in time, the CPU 51 makes a "No" determination in Step 815, and then proceeds to Step 820 so as to output an instruction for bringing all the (four) pressure-reducing valves PD to their excited states (that is, their open states). As a result, all the (four) pressure-reducing valves PD enter their excited states (that is, their open states), whereby the above-described communication control is started.

Subsequently, the CPU 51 proceeds to Step 825 so as to decrement the counter value Non by "1," and then proceeds to Step 895 so as to end the present routine. After that, until the counter value Non, which is decremented through repeated execution of the processing in Step 825, decreases to "0," the CPU 51 repeatedly executes the processing in Steps 800 to 825. As a result, the above-described communication control is continued for the above-described communication time.

When the counter value Non becomes "0" as a result of passage of the communication time, the CPU 51 makes a "No" determination when it proceeds to 810, and proceeds to Step 830 so as to clear the counter value Ntotal to zero. Subsequently, the CPU 51 proceeds to Step 835 so as to output an instruction for bringing all the (four) pressure-reducing valves PD to their non-excited states (that is, their closed states).

As a result, all the (four) pressure-reducing valves PD enter their non-excited states (that is, their closed states), whereby the above-described communication control is ended. Subsequently, the CPU 51 proceeds to Step 840 so as to change the value of the communication control execution flag CONNECT from "1" to "0," and then proceeds to Step 895 so as to end the present routine.

Since the value of the communication control execution flag CONNECT is set to "0" as a result of the above-described processing, the CPU 51 makes a "No" determination when it proceeds to Step 805, and proceeds directly to Step 895 so as to end the present routine. Further, the CPU 51 makes a "Yes" determination when it proceeds to Step 705 of FIG. 7, and again starts the monitoring for determining whether any of the set of conditions of Step 710, the set of conditions of Step 715, and the set of conditions of Step 720 is satisfied.

Next, there is described a case in which the estimated vehicle body speed Vso calculated in Step 510 of FIG. 5 changes from "0" to a value other than "0" as a result of a movement of the vehicle started during a period in which the processing in Steps 800 to 825 is repeatedly executed after the value of the communication control execution flag CONNECT has changed to "1" as a result of satisfaction of the set of conditions of Step 720. In this case, the CPU 51 makes a "Yes" determination when it proceeds to Step 815, and proceeds directly to Steps 835 and 840 so as to bring all the (four) pressure-reducing valves PD to their non-excited states (that is, their closed states), and change the value of the communication control execution flag CONNECT from "1" to "0." As a result, the above-described communication control is immediately ended before elapse of the above-described communication time.

As described above, in embodiment of the brake hydraulic pressure control apparatus for a vehicle according to the present invention, the hydraulic pumps HPf and HPr are driven over a period from start of the ABS control to end of the ABS control, and the drive of the hydraulic pumps HPf and HPr is continued, until a predetermined period of time elapses after completion of the ABS control, in a state in which all the solenoid valves of the brake hydraulic pressure control section 30 have been brought into their non-excited states. Further, in order to perform a so-called initial check operation immediately after the ignition switch has been switched from the OFF state to the ON state, the hydraulic pumps HPf and HPr are driven over the predetermined initial check time Tini in a state in which all the solenoid valves of the brake hydraulic pressure control section 30 are maintained in their non-excited states.

When the driver is considered not to have an intention of performing brake pedal operation; specifically, when the vehicle starts, the vehicle is in an accelerating state, or the ignition switch is in the OFF state, the present apparatus performs communication control adapted to open all the pressure-reducing valves PD (and all the pressure-increasing valves PU) over a predetermined communication time, to thereby establish communication between the primary circuit and the secondary circuit. By virtue of this operation, it becomes possible to prevent generation of air within the secondary circuit, which would otherwise occur because of drive of the hydraulic pumps HPf and HPr, while avoiding occurrence of a state in which a brake hydraulic pressure according to the driver's intention is not generated within the wheel cylinders.

The present invention is not limited to the above-described embodiment, and various modifications may be practiced without departing from the scope of the present invention. For example, in the above-described embodiment, the brake hydraulic pressure control apparatus is configured to open all the (four) pressure-reducing valves PD** when it performs the communication control. However, the brake hydraulic pressure control apparatus may be configured in such a manner that when the communication control is performed, the pressure-reducing valve for one of the two front wheels (i.e., either PDfr or PDfl) and the pressure-reducing valve for one of the two rear wheels (i.e., either PDrr or PDrl) are brought into their open states, and the remaining two pressure-reducing valves are maintained closed. This configuration also establishes, without fail, communication between the primary circuit and the secondary circuit.

In the above-described embodiment, the estimated vehicle body acceleration DVso, which is a calculated value (estimated value), is used as a value indicating an acceleration in the front-back direction of the vehicle body, which is used for determination as to whether the vehicle is in an accelerating state. However, an acceleration sensor for detecting an acceleration in the front-back direction of the vehicle body may be provided. In this case, the brake hydraulic pressure control apparatus may be configured to use a detected vehicle body acceleration obtained on the basis of an output of the acceleration sensor.

In the above-described embodiment, the brake hydraulic pressure control apparatus is configured to set the communication time during which the communication control is performed as a time which is directly proportion to the total drive time of the hydraulic pumps HPf and HPr as measured from the point in time at which the previously executed communication control ends. However, the communication time may be set to a constant time that is independent of the total drive time.

In the above-described embodiment, the brake hydraulic pressure control apparatus is configured to perform the communication control in any one of three cases; i.e., "the case in which the vehicle starts," "the case in which the vehicle is in an accelerating state," and "the case in which the ignition switch IG is in the OFF state." However, the brake hydraulic pressure control apparatus may be configured to perform the communication control only in one of the three cases, or in any two of the three cases.

In the above-described embodiment, the brake hydraulic pressure control apparatus is configured to determine that "the vehicle is in an accelerating state" when all the following three conditions are satisfied simultaneously; (1) the brake switch 43 is in the OFF state, (2) the estimated vehicle body acceleration DVso is greater than the predetermined value DVsoref, and (3) the accelerator pedal operation amount Accp is greater than the predetermined amount Accpref. However, the brake hydraulic pressure control apparatus may configured to determine that "the vehicle is in an accelerating state" when any one or at least two of the three conditions are satisfied.

In the above-described embodiment, the brake hydraulic pressure control apparatus is configured to determine that "the ignition switch IG is in the OFF state" when all the following three conditions are satisfied; (1) a predetermined period has elapsed, with the ignition switch IG maintained in the OFF state, after switching of the ignition switch IG from the ON state to the OFF state, (2) the brake switch 43 is in the OFF state, and the estimated vehicle body speed Vso is "0." However, the brake hydraulic pressure control apparatus may configured in such a manner that at least one of the brake switch 43 being in the OFF state and the estimated vehicle body speed Vso being "0" may be omitted from the above-described three conditions to be used for determining that "the ignition switch IG is in the OFF state."

In the above-described embodiment, the brake hydraulic pressure control apparatus is configured to determine that "the vehicle is in an accelerating state" while using, as one condition, the accelerator pedal operation amount Accp being greater than the predetermined amount Accpref. However, the brake hydraulic pressure control apparatus may be configured to determine that "the vehicle being in an accelerating state" while using, as one condition, "the increasing speed of the engine rotational speed NE obtained from the rotational speed sensor 44 being greater than a predetermined value" in place of the "accelerator pedal operation amount Accp being greater than the predetermined amount Accpref."

In the above-described embodiment, the brake hydraulic pressure control apparatus is configured to perform the communication control when the vehicle enters a state corresponding to one of three cases; i.e., "the case in which the vehicle starts," "the case in which the vehicle is in an accelerating state," and "the case in which the ignition switch IG is in the OFF state." However, "a time elapsed from the point in time when the previously executed communication control ends being equal to or greater than a predetermined time" may be added as a condition for starting the communication control. Further, "the drive control for the hydraulic pumps HPf and HPr having already been performed after the point in time when the previously executed communication control ends" may be added as a condition for starting the communication control.

In the above-described embodiment, the brake hydraulic pressure control apparatus is configured to perform the communication control when the vehicle enters a state corresponding to either "the case in which the vehicle starts" or "the case in which the vehicle is in an accelerating state," when the ignition switch IG is in the ON state. However, the brake hydraulic pressure control apparatus may be configured to start and perform the communication control when the vehicle enters a state corresponding to "the case in which the vehicle starts" and "the case in which the vehicle is in an accelerating state." In this case, the brake hydraulic pressure control apparatus may be configured to stop the communication control when the vehicle leaves the state corresponding to "the case in which the vehicle is in an accelerating state" during performance of the communication control (that is, before elapse of the communication time).

In the above-described embodiment, the brake hydraulic pressure control apparatus of the present invention is applied to a four-wheeled vehicle. However, the brake hydraulic pressure control apparatus of the present invention may be applied to a two-wheeled vehicle.

What is claimed is:

1. A brake hydraulic pressure control apparatus for a vehicle comprising:
a pressure-increasing valve interposed in a hydraulic circuit between a wheel cylinder and a master cylinder which generates brake hydraulic pressure in accordance with brake operation by a driver;
a pressure-reducing valve interposed in a hydraulic circuit between the wheel cylinder and a reservoir;
hydraulic pressure control means for controlling brake hydraulic pressure within the wheel cylinder through control of the pressure-increasing valve and the pressure-reducing valve;
a hydraulic pump for pumping brake fluid that flows from the wheel cylinder to the reservoir via the pressure-reducing valve and returning the pumped brake fluid to a hydraulic circuit between the master cylinder and the pressure-increasing valve;
pump drive means for driving the hydraulic pump in accordance with a state of the vehicle; and
communication control means for performing communication control adapted to open both the pressure-increasing valve and the pressure-reducing valve over a predetermined period of time when the vehicle is in a predetermined state which indicates that the driver does not have an intention of performing the brake operation, wherein the communication control means is configured to change the predetermined time, over which the communication control is performed, in accordance with a total drive time of the hydraulic pump as measured from a point in time at which previously performed communication control has ended.

2. A brake hydraulic pressure control apparatus according to claim 1, wherein the communication control means is configured to determine that the vehicle is in the predetermined state when the vehicle starts.

3. A brake hydraulic pressure control apparatus according to claim 1, wherein the communication control means is configured to determine that the vehicle is in the predetermined state when a brake switch, which enters an ON state or an OFF state depending on whether or not the driver performs brake operation, is in the OFF state.

4. A brake hydraulic pressure control apparatus according to claim 1, wherein the communication control means is configured to determine that the vehicle is in the predetermined state when an acceleration of the vehicle along the front-back direction of a vehicle body is in excess of a predetermined value.

5. A brake hydraulic pressure control apparatus according to claim 1, wherein the communication control means is configured to determine that the vehicle is in the predetermined state when an amount of operation of an accelerator pedal by the driver is in excess of a predetermined value.

6. A brake hydraulic pressure control apparatus according to claim 1, wherein the communication control means is configured to determine that the vehicle is in the predetermined state when an increasing speed of rotational speed of a drive source of the vehicle is in excess of a predetermined value.

7. A brake hydraulic pressure control apparatus according to claim 1, wherein the communication control means is configured to determine that the vehicle is in the predetermined state when at least two of the following conditions are satisfied: (1) a brake switch, which enters an ON state or an OFF state depending on whether or not the driver performs brake operation, is in the OFF state, (2) an acceleration of the vehicle along the front-back direction of a vehicle body is in excess of a predetermined value, (3) an amount of operation of an accelerator pedal by the driver is in excess of a predetermined value, and (4) an increasing speed of rotational speed of a drive source of the vehicle is in excess of a predetermined value.

8. A brake hydraulic pressure control apparatus according to claim 1, wherein the communication control means is configured to determine that the vehicle is in the predetermined state when an ignition switch of the vehicle is in the OFF state.

9. A brake hydraulic pressure control apparatus according to claim 1, wherein the communication control means is configured to determine that the vehicle is in the predetermined state when an ignition switch of the vehicle is in the OFF state and a brake switch, which enters an ON state or an OFF state depending on whether or not the driver performs brake operation, is in the OFF state.

10. A brake hydraulic pressure control apparatus according to claim 1, wherein the communication control means is configured to determine that the vehicle is in the predetermined state when an ignition switch of the vehicle is in the OFF state and a vehicle body speed of the vehicle is zero.

11. A brake hydraulic pressure control apparatus according to claim 8, wherein the communication control means is configured in such a manner that when a vehicle body speed of the vehicle assumes a value other than zero during performance of the communication control, the communication control means stops the communication control, brings the pressure-increasing valve in an open state, and brings the pressure-reducing valve in a closed state.

12. A brake hydraulic pressure control apparatus for a vehicle comprising:
- a pressure-increasing valve interposed in a hydraulic circuit between a wheel cylinder and a master cylinder which generates brake hydraulic pressure in accordance with brake operation by a driver;
- a pressure-reducing valve interposed in a hydraulic circuit between the wheel cylinder and a reservoir;
- hydraulic pressure control means for controlling brake hydraulic pressure within the wheel cylinder through control of the pressure-increasing valve and the pressure-reducing valve;
- a hydraulic pump for pumping brake fluid that flows from the wheel cylinder to the reservoir via the pressure-reducing valve and returning the pumped brake fluid to a hydraulic circuit between the master cylinder and the pressure-increasing valve;
- pump drive means for driving the hydraulic pump in accordance with a state of the vehicle; and
- communication control means for performing communication control adapted to open both the pressure-increasing valve and the pressure-reducing valve over a predetermined period of time when the vehicle is in a predetermined state which indicates that the driver does not have an intention of performing the brake operation, wherein the communication control means is configured to determine that vehicle is in the predetermined state when an ignition switch of the vehicle is in the OFF state;
- the communication control means being configured in such a manner that when a vehicle body speed of the vehicle assumes a value other than zero during performance of the communication control, the communication control means stops the communication control, brings the pressure-increasing vale in an open state, and brings the pressure-reducing valve in a closed state.

* * * * *